United States Patent
Rawat et al.

(10) Patent No.: US 9,047,908 B2
(45) Date of Patent: Jun. 2, 2015

(54) HEAT-ASSISTED MAGNETIC RECORDING (HAMR) HEAD WITH DIFFUSION BARRIER BETWEEN WAVEGUIDE CORE AND WRITE POLE LIP

(71) Applicant: HGST Netherlands B.V., Amsterdam (NL)

(72) Inventors: Vijay Prakash Singh Rawat, San Jose, CA (US); Neil Leslie Robertson, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 175 days.

(21) Appl. No.: 13/868,897

(22) Filed: Apr. 23, 2013

(65) Prior Publication Data
US 2014/0313872 A1    Oct. 23, 2014

(51) Int. Cl.
| | |
|---|---|
| *G11B 11/00* | (2006.01) |
| *G11B 13/04* | (2006.01) |
| *G11B 5/48* | (2006.01) |
| *G11B 5/31* | (2006.01) |
| *G11B 5/60* | (2006.01) |
| *G11B 5/00* | (2006.01) |

(52) U.S. Cl.
CPC ............ *G11B 13/045* (2013.01); *G11B 5/6088* (2013.01); *G11B 5/4866* (2013.01); *G11B 5/314* (2013.01); *G11B 2005/0021* (2013.01)

(58) Field of Classification Search
CPC ........... G11B 2005/0021; G11B 5/314; G11B 5/6088; G11B 13/04; G11B 13/08; G11B 5/3116; G11B 5/3133; G11B 5/1278; G11B 5/3163; G11B 5/607; G11B 5/7325; G11B 5/1272; G11B 5/3106; G11B 5/3136
USPC .......... 369/13.33, 13.32, 13.24, 13.14, 13.03, 369/13.02, 13.12, 13.13, 13.01, 112.27; 360/125.74, 125.31
See application file for complete search history.

(56) References Cited

U.S. PATENT DOCUMENTS

| | | | |
|---|---|---|---|
| 6,982,932 B2 * | 1/2006 | Sakakima et al. ......... | 369/13.17 |
| 7,187,520 B2 | 3/2007 | Lee | |
| 7,239,481 B2 | 7/2007 | Lille et al. | |
| 7,262,936 B2 | 8/2007 | Hamann | |
| 7,623,319 B2 | 11/2009 | Pinarbasi | |
| 7,880,996 B2 * | 2/2011 | Stipe ............................. | 360/59 |
| 8,339,740 B2 * | 12/2012 | Zou et al. ................. | 360/125.31 |

(Continued)

*Primary Examiner* — Ali Neyzari
(74) *Attorney, Agent, or Firm* — Thomas R. Berthold (57) ABSTRACT

A heat-assisted magnetic recording (HAMR) head in which the core of the optical waveguide has an end face that abuts the NFT and the write pole lip has a diffusion barrier between the end face of the waveguide core and the write pole lip. The diffusion barrier layer may also be located between the waveguide core end face and the NFT, in which case it is formed of an optically transparent material, like $TaN_x$, $TiN_x$, $ZrN_x$, $HfN_x$, $NbN_x$, $CrN_x$, $VN_x$, TiC, TaC, WC, SiC or $SiN_x$, or a layer of Au, Ru, Rh or Ir with a thickness less than 5 nm. In addition to being located between both the NFT and the write pole lip and the waveguide core end face, the diffusion barrier layer may also be located between the waveguide core and the lower waveguide cladding layer.

20 Claims, 7 Drawing Sheets

(56) References Cited

U.S. PATENT DOCUMENTS

| | | |
|---|---|---|
| 8,351,151 B2 * | 1/2013 | Katine et al. .................. 360/110 |
| 8,432,773 B2 * | 4/2013 | Hara et al. .................. 369/13.33 |
| 8,488,277 B2 * | 7/2013 | Kanegae ....................... 360/135 |
| 2010/0177426 A1 | 7/2010 | Kanegae |
| 2012/0045662 A1 | 2/2012 | Zou et al. |
| 2012/0105996 A1 | 5/2012 | Katine et al. |
| 2012/0127839 A1 | 5/2012 | Rawat et al. |
| 2012/0147716 A1 | 6/2012 | Hara |
| 2012/0213042 A1 | 8/2012 | Aoki |

* cited by examiner

HEAT-ASSISTED MAGNETIC RECORDING (HAMR) HEAD WITH DIFFUSION BARRIER BETWEEN WAVEGUIDE CORE AND WRITE POLE LIP

TECHNICAL FIELD

This invention relates generally to a heat-assisted magnetic recording (HAMR) head in a HAMR disk drive, in which data are written while the magnetic recording layer on the disk is at an elevated temperature.

BACKGROUND OF THE INVENTION

In conventional magnetic recording, thermal instabilities of the stored magnetization in the recording media can cause loss of recorded data. To avoid this, media with high magnetocrystalline anisotropy ($K_u$) are required. However, increasing $K_u$ also increases the coercivity of the media, which can exceed the write field capability of the write head. Since it is known that the coercivity of the magnetic material of the recording layer is temperature dependent, one proposed solution to the thermal stability problem is heat-assisted magnetic recording (HAMR), wherein high-$K_u$ magnetic recording material is heated locally during writing to lower the coercivity enough for writing to occur, but where the coercivity/anisotropy is high enough for thermal stability of the recorded bits at the ambient temperature of the disk drive (i.e., the normal operating or "room" temperature of approximately 15-30° C.). In some proposed HAMR systems, the magnetic recording material is heated to near or above its Curie temperature. The recorded data is then read back at ambient temperature by a conventional magnetoresistive read head, i.e., a giant magnetoresistance (GMR) or tunneling magnetoresistance (TMR) based read head. HAMR disk drives have been proposed for both conventional continuous media, wherein the magnetic recording material is a continuous layer on the disk, and for bit-patterned media (BPM), wherein the magnetic recording material is patterned into discrete data islands or "bits".

One type of proposed HAMR disk drive uses a laser source and an optical waveguide coupled to a near-field transducer (NFT) for heating the recording material on the disk. A "near-field" transducer is an optical device with subwavelength features that is used to concentrate the light delivered by the waveguide into spot smaller than the diffraction limit and at a distance smaller than the wavelength of light. In a HAMR head, the NFT is typically located at the air-bearing surface (ABS) of the slider that also supports the read/write head and rides or "flies" above the disk surface while creating the sub-diffraction-limited optical spot on the disk.

In some HAMR head designs, the write head includes a write pole with a lip at the ABS. The write pole lip is located at the ABS close to the NFT. The core of the optical waveguide has an end face that abuts the NFT so that light can be transmitted to the NFT. Because of the close proximity of the write pole lip to the NFT, the waveguide core end face may also abut the write pole lip. This may result in diffusion between the materials of the waveguide core and the magnetic materials of the write pole lip, which can degrade the performance of both the write pole and the waveguide.

What is needed is a HAMR head that prevents diffusion of materials between the waveguide core and the write pole lip.

SUMMARY OF THE INVENTION

The invention relates to a HAMR head in which the core of the optical waveguide has an end face that abuts the NFT and the write pole lip. A diffusion barrier layer is located between the end face of the waveguide core and the write pole lip and may be formed of an optically opaque material, like Au, Rh, Ru or Ir. The diffusion barrier layer may also be located between the waveguide core end face and the NFT, in which case it is formed of an optically transparent material, like $TaN_x$, $TiN_x$, $ZrN_x$, $HfN_x$, $NbN_x$, $CrN_x$, $VN_x$, TiC, TaC, WC, SiC or $SiN_x$, or a layer of Au, Rh, Ru or Ir with a thickness less than 5 nm so as to be optically transparent. In addition to being located between both the NFT and the write pole lip and the waveguide core end face, the diffusion barrier layer may also be located between the waveguide core and the lower waveguide cladding layer.

For a fuller understanding of the nature and advantages of the present invention, reference should be made to the following detailed description taken together with the accompanying figures.

DETAILED DESCRIPTION OF THE INVENTION

Figure 1:
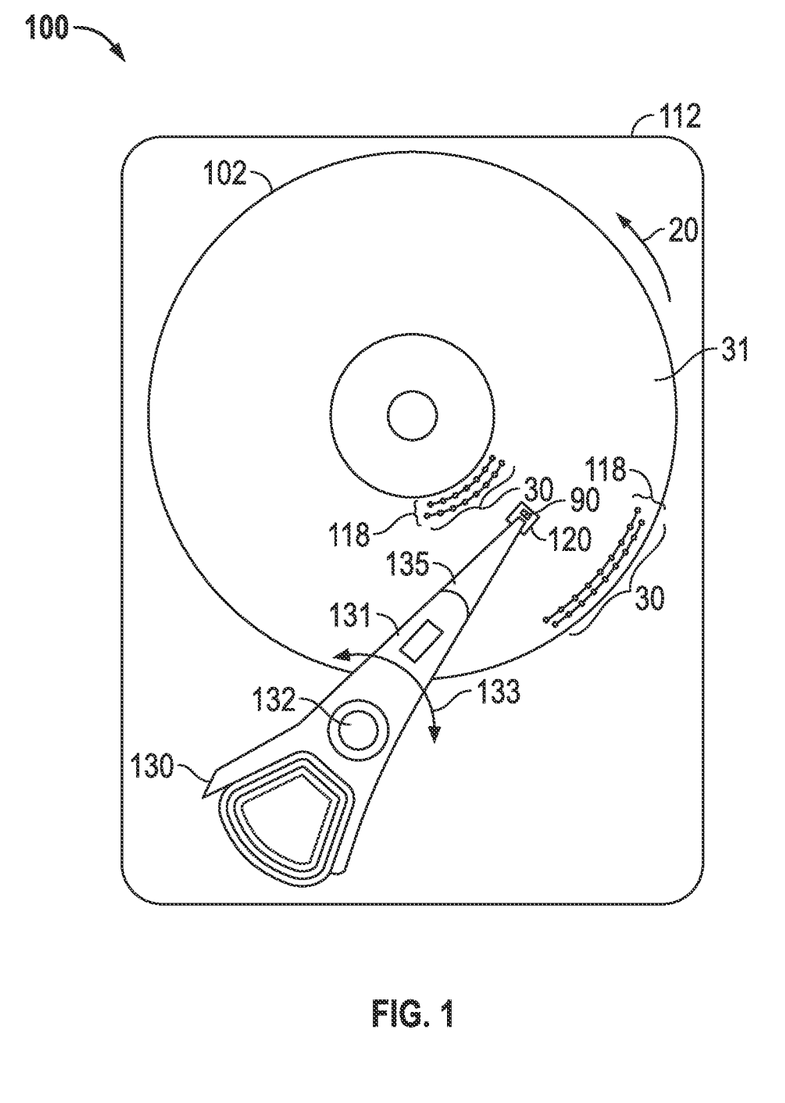
FIG. 1 is a top view of a heat-assisted magnetic recording (HAMR) disk drive according to the invention.

FIG. 1 is a top view of a thermally-assisted recording (HAMR) disk drive 100 according to the invention. In FIG. 1, the HAMR disk drive 100 is depicted with a disk 102 with the magnetic recording layer 31 patterned into discrete data islands 30 of magnetizable material arranged in radially-spaced circular tracks 118. Only a few representative islands 30 and representative tracks 118 near the inner and outer diameters of disk 102 are shown. However, instead of the bit-patterned-media (BPM) shown with discrete data islands 30 in FIG. 1, the HAMR disk drive may instead use disks in which the recording layer 31 is a conventional continuous magnetic recording layer of magnetizable material.

The drive 100 has a housing or base 112 that supports an actuator 130 and a drive motor for rotating the magnetic recording disk 102. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as an air-bearing slider 120, attached to the other end of suspension 135. The suspension 135 permits the slider 120 to be maintained very close to the surface of disk 102 and enables it to "pitch" and "roll" on the air-bearing generated by the disk 102 as it rotates in the direction of arrow 20. The slider 120 supports the HAMR head (not shown), which includes a magnetoresistive read head, an inductive write head, the near-field transducer (NFT) and optical waveguide. A semiconductor laser 90 with a wavelength of 780 to 980 nm may used as the HAMR light source and is depicted as being supported on the top of slider 120. Alternatively the laser may be located on suspension 135 and coupled to slider 120 by an optical channel. As the disk 102 rotates in the direction of arrow 20, the movement of actuator 130 allows the HAMR head on the slider 120 to access different data tracks 118 on disk 102. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

Figure 2:
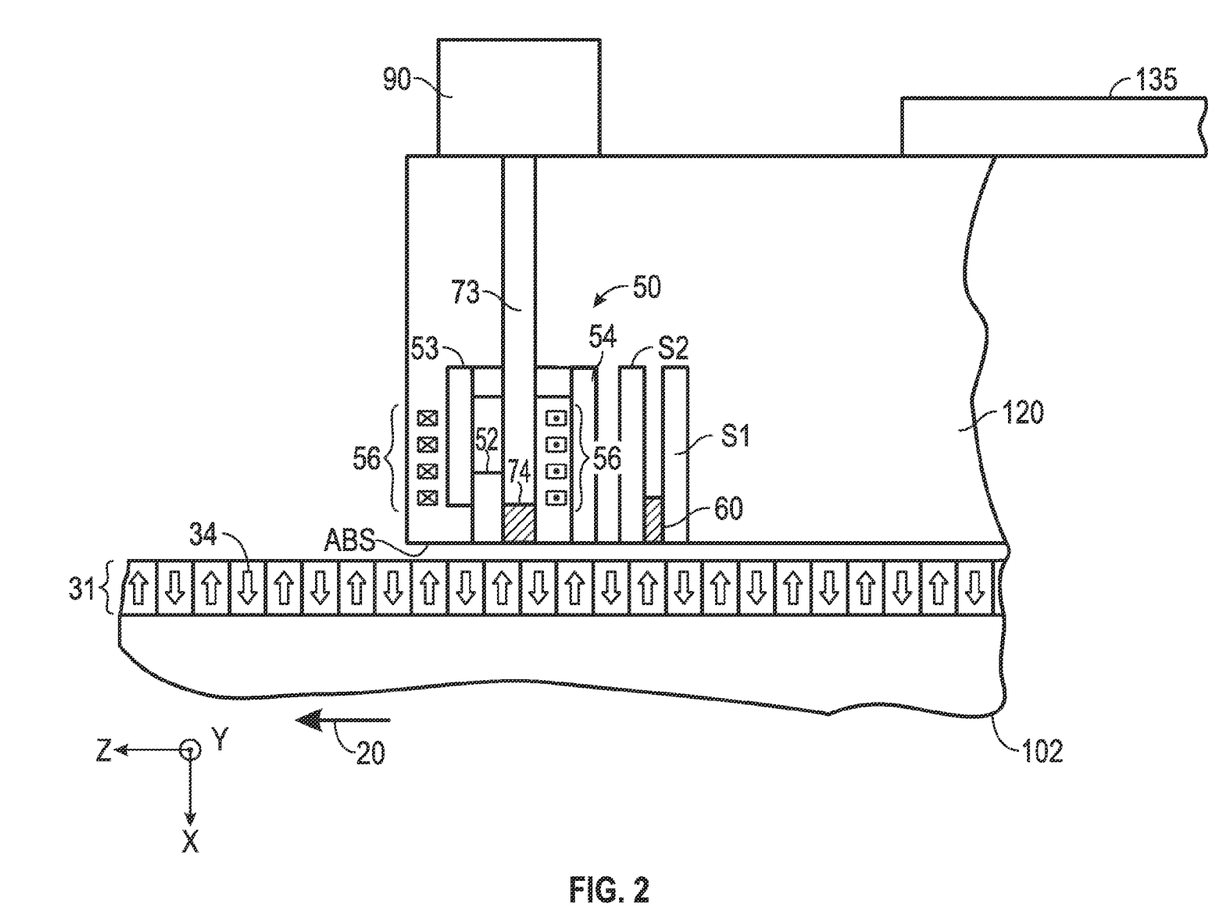
FIG. 2 depicts a sectional view, not drawn to scale because of the difficulty in showing the very small features, of an air-bearing slider for use in HAMR disk drive and a portion of a HAMR disk according to the invention.

In the following drawings, the X direction denotes a direction perpendicular to the air-bearing surface (ABS) of the slider, the Y direction denotes a track width or cross-track direction, and the Z direction denotes an along-the-track direction. FIG. 2 is a schematic cross-sectional view illustrating a configuration example of a HAMR head according to the present invention. In FIG. 2, the disk 102 is depicted with the recording layer 31 being a conventional continuous magnetic recording layer of magnetizable material with magnetized regions or "bits" 34. The air-bearing slider 120 is supported by suspension 135 and has an ABS that faces the disk 102 and supports the magnetic write head 50, read head 60 with magnetically permeable read head shields S1 and S2, and the optical near-field transducer (NFT) 74. A semiconductor laser 90 is mounted to the top surface of slider 120. An optical waveguide 73 guides light from laser 90 to NFT 74. A recording magnetic field is generated by the write head 50 made up of a coil 56, a magnetic main pole 53 for transmitting flux generated by the coil 56, a write pole 52 connected to main pole 53, and a return pole 54. The magnetic field generated by the coil 56 is transmitted through the main pole 53 to the write pole 52 located at the ABS near the NFT 74. At the moment of recording, the recording layer 31 of disk 102 is heated by an optical near-field generated by the NFT 74 and, at the same time, a region or "bit" 34 is magnetized and thus written onto the recording layer 31 by applying a recording magnetic field from the write pole 52.

Figure 3A:
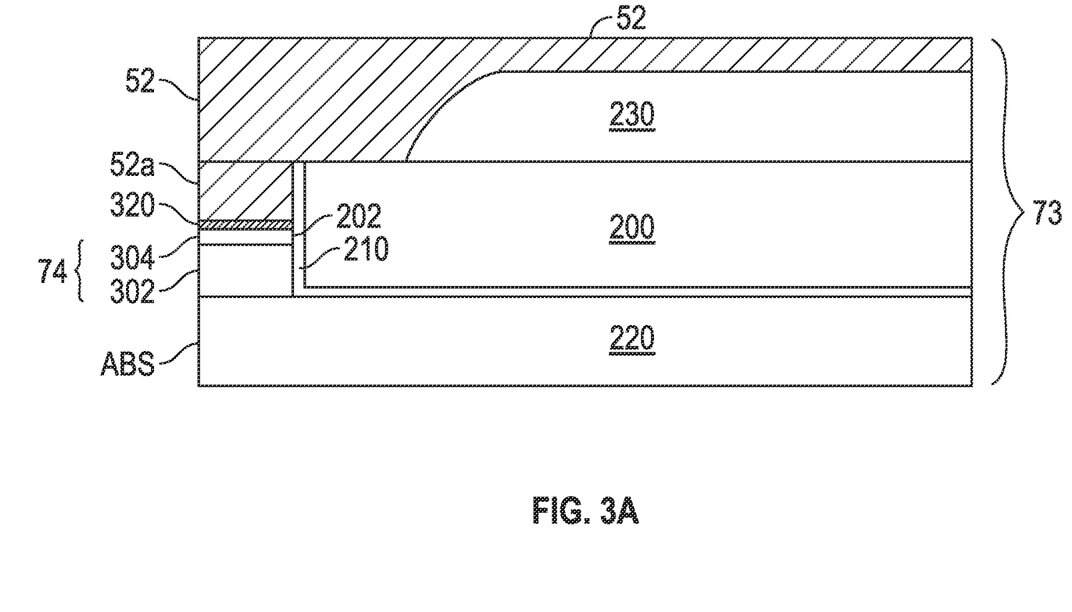
FIG. 3A is an expanded sectional view of a portion of FIG. 2, showing the diffusion barrier layer relative to the waveguide, the near-field transducer (NFT) and the write pole near the air-bearing surface (ABS).

FIG. 3A is an expanded sectional view of the waveguide 73, NFT 74 and write pole 52 near the ABS. The waveguide includes a first or lower cladding layer 220, the waveguide core 200 on first cladding layer 220, and a second or upper cladding layer 230 between the core 200 and the write pole 52. The cladding material surrounds the waveguide core. The waveguide core 200 has an end face 202 that is generally parallel to and recessed from the ABS. Materials that ensure a refractive index of the waveguide core 200 material to be greater than a refractive index of the cladding material may be used for the waveguide core 200. For example, $Al_2O_3$, $SiO_2$, $MgF_2$, $CaF_2$, silicon oxynitride ($SiO_xN_y$) or their composites can be used as the cladding material while $TiO_2$, $Ta_2O_5$, $ZrO_2$, $Nb_2O_3$, $SiN_x$ or their composites can be used as waveguide core materials. Additionally, composites of $TiO_2$, $Ta_2O_5$, $ZrO_2$, $Nb_2O_3$, $SiN_x$ with $SiO_2$ and/or $Al_2O_3$ may also be used as the core material.

Figure 3B:
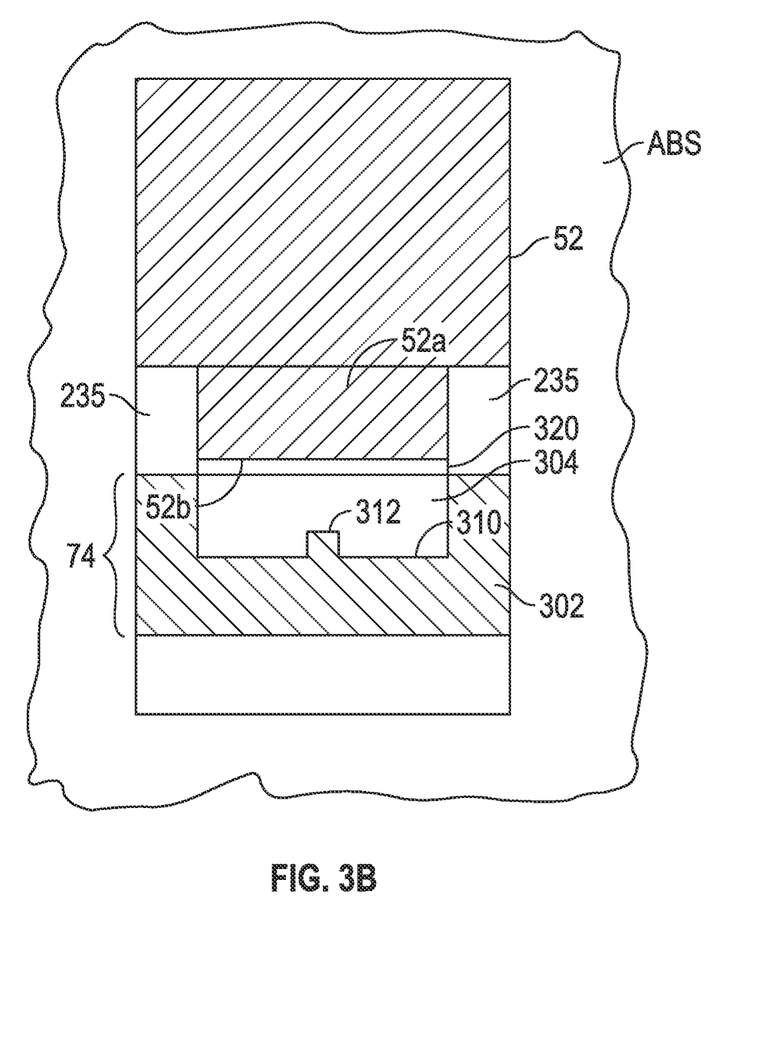
FIG. 3B is a view of the ABS of FIG. 3A and more clearly shows the magnetic write pole lip and the "E-shaped" antenna and aperture portions of the NFT.

The write pole 52 has a lip 52a located between the waveguide core end face 202 and the ABS. The NFT 74 is also located between the waveguide core end face 202 and the ABS and is depicted as a metallic antenna 302 generally surrounding an aperture portion 304. A diffusion barrier 320 is located between write pole lip 52a and aperture portion 304 of NFT 74. FIG. 3B is a view of the ABS of FIG. 3A and more clearly shows the magnetic write pole lip 52a, the "E-shaped" antenna 302 and aperture 304. Side portions 235, at either side of the magnetic lip 52 can be constructed of cladding material similar to or the same as the cladding material for cladding layers 220, 230. Alternatively, antenna 302 can extend up the sides of the lip 52a so that the side portions 235 are constructed of the same material as the antenna 302. The antenna 302 is formed adjacent to the aperture 304, forming an interface 310 there-between. The antenna 302 can be constructed of a metallic material such as Au, Ag, Cu or Rh. The magnetic lip 52a is magnetically connected with the write pole 52 and functions magnetically as a part of the write pole 52. The magnetic lip 52a is constructed of a magnetic metal such as a binary or ternary compound containing Co, Fe, Cr and or Ni (e.g. CoFe, CoFeCr, CoFeNi), and the leading most edge 52b functions as the writing edge of the lip 52a. The aperture 304 is constructed of a low refractive index dielectric material such as SiOx, SiOxNy, $Al_2O_3$ or some other similar dielectric having a refractive index less than 1.75.

When light travels through the waveguide 73 (FIG. 3A), a plasmonic wave is formed at the interface 310 (FIG. 3B). The interface 310 is formed with a notch 312, which is designed to form nodes in the plasmonic wave at desired locations. The laser light impinging at the metal-dielectric interface 310 has its polarization parallel to the notch 312 and thus creates a resonant plasmonic wave. The broad "wing" regions of the E-shaped antenna 302 act as charge reservoirs and hence, set up the boundary condition. The space charge concentration is increased at the sub-100 nm dimension notch 312 of the antenna 302 as compared to the rest of the antenna due to a "lightning rod" effect. This concentration of light energy at sub-wavelength dimensions leads to generation of a hot spot at the notch 312. This hot spot is used to locally heat the magnetic recording layer 31 (FIG. 2) to temporarily lower the magnetic coercivity at that location. This extreme heating may cause inter-diffusion of material between the aperture 304, which may be for example $SiO_2$, and the magnetic lip 52a. This inter-diffusion would cause degradation in the performance of the write pole 52 and degradation of the optical properties of the aperture 304. Thus a thin diffusion barrier layer 320, which may be formed of Au, Rh, Ru, Ir, $TaN_x$ or $SiN_x$ to a thickness of about 5 nm or less prevents this inter-diffusion. An optional adhesion layer (not shown), such as Ta, may be located on one or both sides of diffusion barrier layer 320. A HAMR head with a diffusion barrier between the write pole lip and the aperture is described in U.S. Pat. No. 8,351, 151 B2, which is assigned to the same assignee as this application.

Referring again to FIG. 3A, in this invention the end face 202 of waveguide core faces both the metallic NFT 74 (metallic antenna 302 and aperture 304) as well as the magnetic write pole lip 52a. It has been found that there can be oxidation of the pole lip 52a magnetic material, typically one or more of Co, Fe and Ni, at the waveguide core end face 202. This oxidation would degrade the performance of the write pole lip 52a. Thus in this invention a barrier layer 210 is located between the write pole lip 52a and the end face 202 of the waveguide core 200. The diffusion barrier layer 210 may also be located between both the NFT 74 (metallic antenna 302 and aperture 304) and the write pole lip 52a and the waveguide core end face 202 (as shown in FIG. 3A). In addition to being located between both the NFT 74 and the write pole lip 52a and the waveguide core end face 202, the diffusion barrier layer may also be located between the waveguide core 200 and the cladding layer 220 (also as shown in FIG. 3A). The portion of the diffusion barrier layer 210 that abuts NFT 74 has to be transparent in the wavelength range of interest (approximately 780-980 nm) because it is in the path of the incident laser beam. Possible materials for diffusion barrier layer 210 include $TaN_x$, $TiN_x$, $ZrN_x$, $HfN_x$, $NbN_x$, $CrN_x$, $VN_x$, TiC, TaC, WC, SiC and $SiN_x$. The preferred thickness of the diffusion barrier layer 210 is between 0.5 to 10 nm. Additionally, ultrathin metal films such as Au, Ru, Rh and Ir with a thickness greater than 0.5 nm and less than 5 nm can be used for diffusion barrier layer 210 because these materials will be optically transparent at thicknesses less than 5 nm. An optional adhesion layer (not shown), such as a layer of Ta, Cr, Ti or Si with a thickness less than 2 nm may be located on either side of diffusion barrier layer 210. Also, an optional thin layer of $SiO_2$ (not shown) with a thickness less than about 40 nm can be located between layer 210 and waveguide core 200 both along the length of cladding layer 220 and at the end face 202, to improve the optical efficiency of the waveguide.

Figure 3C:
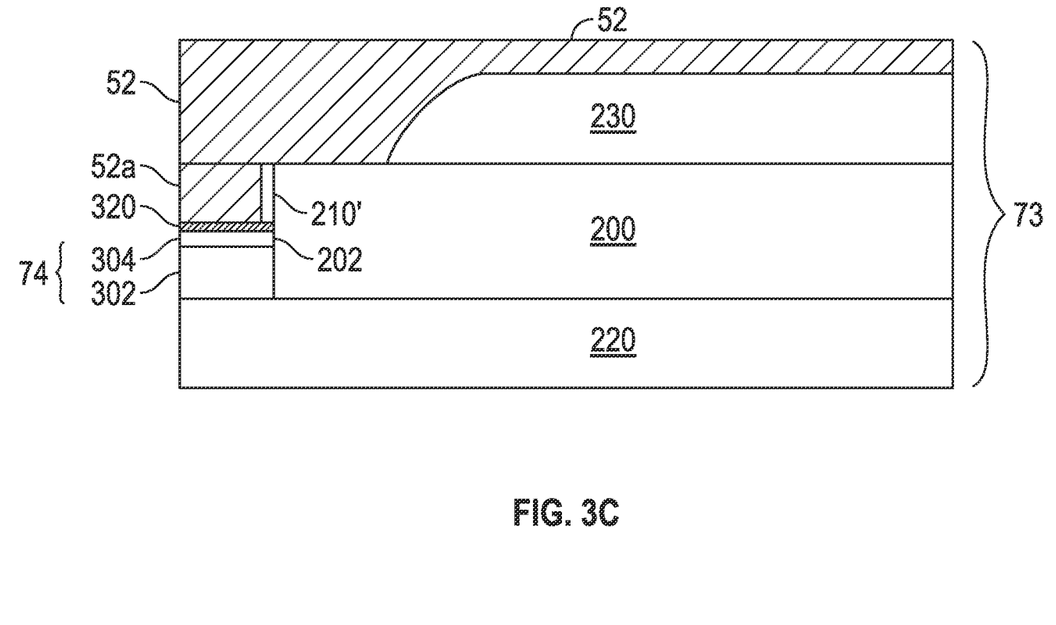
FIG. 3C is a sectional view of an embodiment of the invention wherein the diffusion barrier layer is located between the write pole lip and just that portion of the end face of the waveguide core that abuts the write pole lip.

FIG. 3C is a sectional view of an embodiment of the invention wherein the diffusion barrier layer 210' is located between the write pole lip 52a and just that portion of the end face 202 of waveguide core 200 that abuts the pole lip 52a. In this embodiment, because the diffusion barrier 210' is not also located between the NFT 74 and the end face 202 of waveguide core 200, it can be formed of an optically opaque material, such as Au, Ru, Rh or Ir. An optional adhesion layer (not shown), such as Ta, may be located on one or both sides of the optically opaque diffusion barrier layer 210'.

Figure 4A:
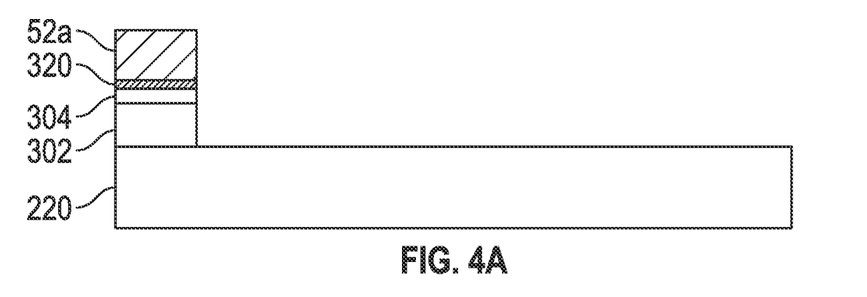
FIGS. 4A-4C are sectional views showing the process for forming the diffusion barrier layer shown FIGS. 3A-3B.
Figure 4B:
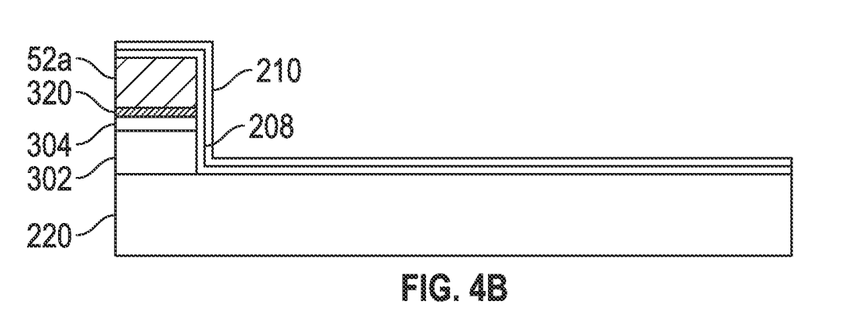
Figure 4C:
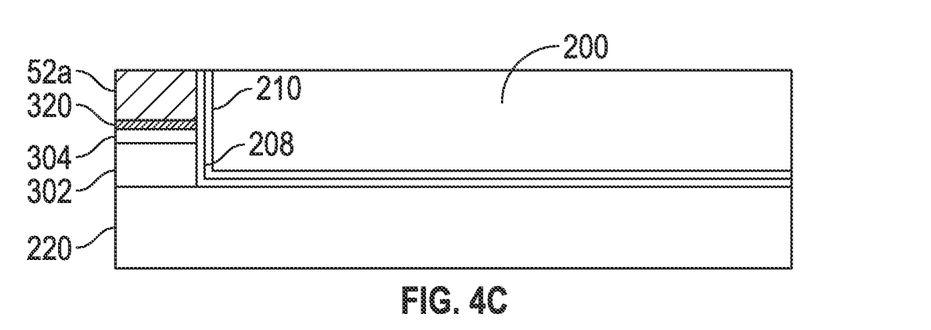

FIGS. 4A-4B are sectional views showing the process for forming the diffusion barrier layer 210 shown FIGS. 3A-3B. In FIG. 4A, the metallic layer for antenna 302, the material for aperture 304, the diffusion barrier 320 and the metallic material for pole lip 52a have been deposited as full films on cladding layer 220 and then lithographically patterned and ion milled, leaving the structure in FIG. 4A. In FIG. 4B, an optional adhesion layer 208 and diffusion barrier layer 210 have been deposited by ion beam deposition at a 45 degree angle to the surface of cladding layer 220. This forms the optional adhesion layer 208 and 210 on the cladding layer 220 and on the back edges of layers 302, 304, 320, 52a that will face the end face of the waveguide core. In FIG. 4C, the material for waveguide core 200 has been deposited and then the structure has been chemical-mechanical-polished (CMP) leaving a smooth upper surface for subsequent deposition of the upper cladding layer.

Figure 5A:
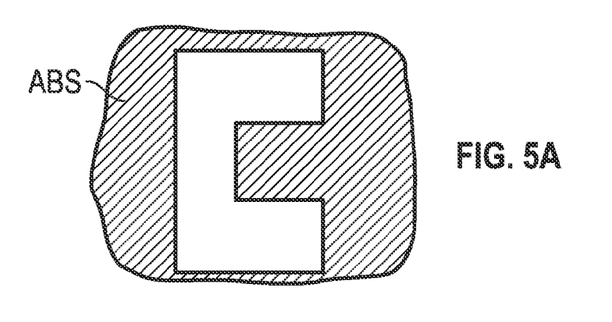
FIGS. 5A-5C illustrate other types of NFTs, including a C-shaped aperture (FIG. 5A), a bowtie-shaped aperture (FIG. 5B), and a bowtie-shaped antenna (FIG. 5C).
Figure 5B:
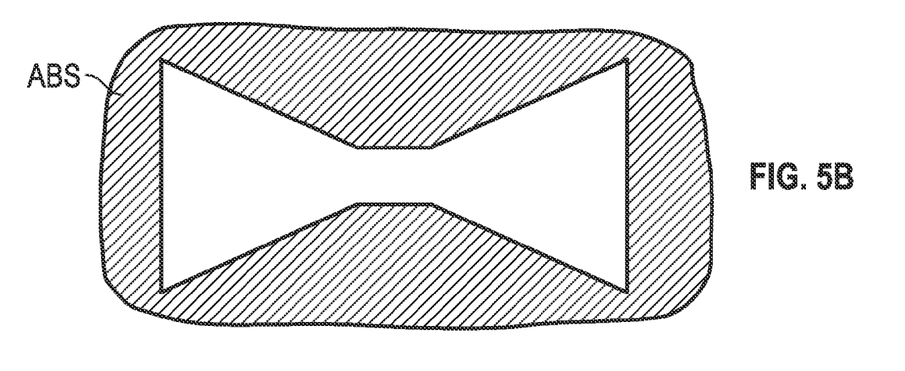
Figure 5C:
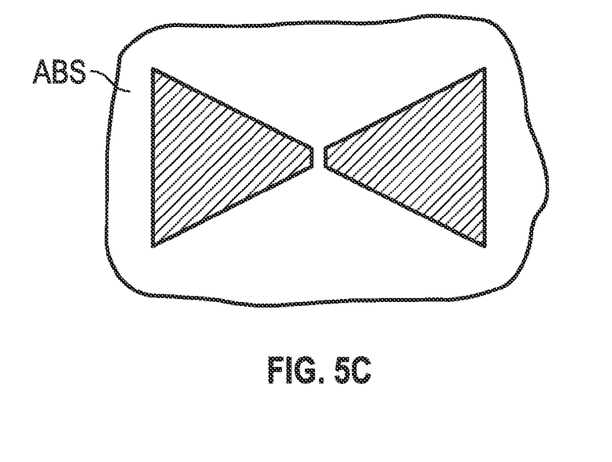

The invention has been described for a NFT having a generally E-shaped antenna. However, the invention is applicable to other types of NFTs with well known antenna and aperture shapes. FIGS. 5A-5C illustrate other shapes, in particular a C-shaped aperture (FIG. 5A), a bowtie-shaped aperture (FIG. 5B), and a bowtie-shaped antenna (FIG. 5C).

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) head for writing to a magnetic recording layer comprising:
a head carrier having a recording-layer-facing surface;
a write pole on a surface orthogonal to the recording-layer-facing surface of the head carrier and having a lip at the recording-layer-facing surface;
an optical waveguide on the head carrier having a core oriented parallel to the write pole and an end face recessed from and parallel to the recording-layer-facing surface;
a diffusion barrier layer sandwiched between the write pole lip and the waveguide core end face; and
a near-field transducer (NFT) layer on the head carrier at the recording-layer-facing surface and optically coupled to the waveguide core end face.

2. The HAMR head of claim 1 wherein the diffusion barrier layer is formed of an optically opaque material.

3. The HAMR head of claim 2 wherein the diffusion barrier layer is formed of a material selected from Au, Ru, Rh and Ir.

4. The HAMR head of claim 1 wherein the diffusion barrier layer is also sandwiched between the NFT and the waveguide core end face.

5. The HAMR head of claim 4 further comprising a layer of $SiO_2$ between the waveguide core end face and the portion of the diffusion barrier layer adjacent the NFT for improving the optical efficiency of the optical waveguide.

6. The HAMR head of claim 4 wherein the diffusion barrier layer is formed of an optically transparent material.

7. The HAMR head of claim 6 wherein the optically transparent material is selected from $TaN_x$, $TiN_x$, $ZrN_x$, $HfN_x$, $NbN_x$, $CrN_x$, $VN_x$, TiC, TaC, WC, SiC and $SiN_x$.

8. The HAMR head of claim 6 wherein the diffusion barrier layer is a layer having a thickness less than or equal to 5 nm and greater than or equal to 0.5 nm and selected from Au, Ru, Rh and Ir.

9. The HAMR head of claim 1 wherein the optical waveguide further comprises a first cladding layer, the waveguide core being located on the first cladding layer, and a second cladding layer between the waveguide core and the write pole, and wherein the diffusion barrier layer is also located between the waveguide core and the first cladding layer.

10. The HAMR head of claim 9 further comprising a layer of $SiO_2$ between the waveguide core and the portion of the diffusion barrier layer adjacent the first cladding layer for improving the optical efficiency of the optical waveguide.

11. The HAMR head of claim 1 further comprising an adhesion layer selected from Si, Ti, Ta and Cr between the write pole lip and the waveguide core end face.

12. The HAMR head of claim 11 wherein the adhesion layer is located between the write pole lip and the diffusion barrier layer.

13. The HAMR head of claim 1 wherein the diffusion barrier layer has a thickness less than or equal to 10 nm and greater than or equal to 0.5 nm.

14. The HAMR head of claim 1 wherein the NFT is selected from an E-shaped antenna, a C-shaped aperture, a bowtie-shaped aperture, and a bowtie-shaped antenna.

15. A heat-assisted magnetic recording (HAMR) disk drive comprising:
the HAMR head of claim 1;
a laser for directing light to the waveguide; and
a magnetic recording disk having a magnetic recording layer.

16. The HAMR disk dive of claim 15 wherein the magnetic recording layer is patterned into concentric tracks containing discrete islands of magnetic material.

17. A heat-assisted magnetic recording (HAMR) head for writing to a magnetic recording layer in a disk drive comprising:
an air-bearing slider having an air-bearing surface (ABS) for facing the recording layer;

a write pole on a slider surface orthogonal to the ABS and having a lip at the ABS;

a near-field transducer (NFT) layer on the slider at the ABS;

an optical waveguide on the slider for transmitting light to the NFT and having a core oriented parallel to the write pole and an end face recessed from and parallel to the ABS, the waveguide core end face facing the write pole lip and the NFT;

a diffusion barrier layer sandwiched between the waveguide core end face and both the write pole lip and the NFT, the diffusion barrier layer being formed of a material optically transparent to the light.

18. The HAMR head of claim 17 wherein the diffusion barrier layer is a layer having a thickness less than or equal to 10 nm and greater than or equal to 0.5 nm and selected from $TaN_x$, $TiN_x$, $ZrN_x$, $HfN_x$, $NbN_x$, $CrN_x$, $VN_x$, TiC, TaC, WC, SiC and $SiN_x$ or a layer having a thickness less than or equal to 5 nm and greater than or equal to 0.5 nm and selected from Au, Ru, Rh and Ir.

19. The HAMR head of claim 17 wherein the optical waveguide further comprises a first cladding layer, the waveguide core being located on the first cladding layer, and a second cladding layer between the waveguide core and the write pole, and wherein the diffusion barrier layer is also located between the waveguide core and the first cladding layer.

20. The HAMR head of claim 17 further comprising an adhesion layer selected from Si, Ti, Ta and Cr between the write pole lip and the waveguide core end face.

* * * * *